United States Patent [19]

Zagorski et al.

[11] Patent Number: 4,966,322
[45] Date of Patent: Oct. 30, 1990

[54] HOLDER FOR SKI GOGGLES

[76] Inventors: Joseph Zagorski; Robin J. Zagorski, both of 355 Marquesa Dr., Coral Gables, Fla. 33156

[21] Appl. No.: 428,940

[22] Filed: Oct. 30, 1989

[51] Int. Cl.⁵ ............................................. A45F 5/00
[52] U.S. Cl. ................................... 224/267; 224/250; 224/901; 2/338; 206/5
[58] Field of Search ............... 224/267, 250, 901, 222, 224/219; 351/155; 24/3 C, 200; 2/338, 240, 311; 206/5

[56] References Cited

U.S. PATENT DOCUMENTS

| | | |
|---|---|---|
| 3,543,977 | 12/1970 | Lockridge ............................ 224/901 |
| 4,051,554 | 10/1977 | Kallman ............................... 224/901 |
| 4,055,873 | 11/1977 | Kallman ................................. 2/94 |
| 4,135,653 | 1/1979 | Sieloff . |
| 4,432,477 | 2/1984 | Haidt et al. ......................... 224/901 |
| 4,500,019 | 2/1985 | Curley, Jr. ........................... 224/222 |
| 4,509,667 | 4/1985 | Meldrum ............................. 224/901 |
| 4,759,963 | 7/1988 | Uso, Jr. et al. ...................... 224/901 |

Primary Examiner—Linda J. Sholl
Attorney, Agent, or Firm—Larson & Taylor

[57] ABSTRACT

An adjustable elastic band is provided which fits around the upper arm of the user with a strap secured to the band having Velcro fasteners thereon so that the strap can be secured around ski goggles to retain the goggles against the upper outer side of the arm of the wearer.

2 Claims, 2 Drawing Sheets

HOLDER FOR SKI GOGGLES

BACKGROUND OF THE INVENTION

The invention relates to an armband having a strap thereon which is adapted to fit around ski goggles and fasten so as to retain the ski goggles on the upper portion of the arm of the wearer.

In the prior art there are disclosures of devices for retaining various articles on the arm of a user. The Kallman Patent 4,055,873 discloses a holder for goggles wherein a strap is permanently fixed to the sleeve of a ski jacket and the strap is provided with Velcro fastening means so as to secure ski goggles to the ski jacket. There are also disclosed in the prior art straps which extend around the arm for retaining various objects. The Meldrum patent 4,509,667 discloses an armband for retaining a camera. The Sieloff patent 4,135,653 discloses a strap which surrounds the arm and is provided with a holder for a portable radio. Other prior art includes patent 4,432,477 which shows an adjustable band having a pocket thereon for retaining a musical tape player and patent 4,500,019 which discloses an armband which may be inflated so as to conform to the contour of the arm.

SUMMARY OF THE INVENTION

According to the present invention there is provided an elastic armband which is adjustable in length and is adapted to fit around the upper arm of a skier. There is provided a strap which is affixed to the armband, the strap having extensions at each end thereof and being provided with Velcro fastening means thereon.

In use, the user adjusts the armband to fit the upper arm and, when ski goggles are not needed, the wearer can readily retain the ski goggles on the outer side of the arm by simply placing the goggles against the armband and securing the strap around the ski goggles by means of the Velcro fastening means on the strap. The holder for ski goggles is easy to adjust and the ski goggles may be readily retained in the holder or removed therefrom using only one hand. The ski goggle holder can be used interchangeably on any ski outfit, ski jacket, parka, sweater, bare arm, or any other type of clothing.

An object of the present invention is to provide a retainer for ski goggles on the upper portion of the arm of the user.

Another object of the present invention is to provide a ski goggle holder which is adjustable in length and which retains the ski goggles by means of a strap against the upper portion of the arm of the user.

Another object of the present invention is to allow a skier the versatility to wear the ski goggle holder on any ski outfit, jacket, parka, sweater, shirt, bare arm or any other type of clothing.

Other objects and many of the intended advantages of the present invention will become more readily apparent upon consideration of the following detailed specification in connection with the accompanying drawing wherein:

FIG. 1 is a view of the armband for retaining ski goggles without the goggles,

FIG. 2 shows the holder for ski goggles with the ski goggles in place retained upon the upper portion of the arm, FIG. 3 is a plan view of one embodiment of the holder for ski goggles, FIG. 4 is a side elevation of the embodiment shown in FIG. 3, FIG. 5 is a partial plan view of the FIG. 3 embodiment showing the strap in extended position, FIG. 6 is a plan view of another embodiment of the holder for ski goggles, and FIG. 7 is a side elevation of the embodiment shown in FIG. 6.

DETAILED DESCRIPTION OF A PREFERRED EMBODIMENT

Figure 1:
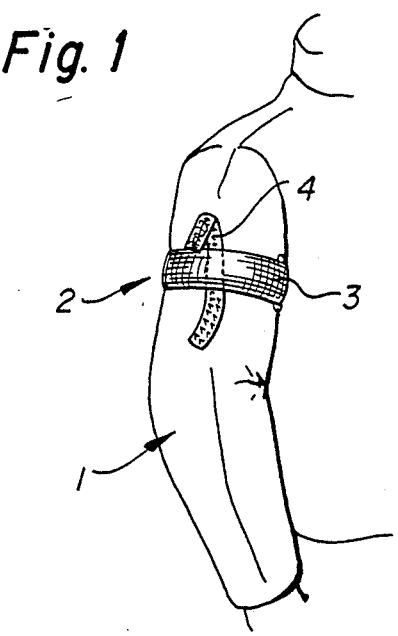
Figure 2:
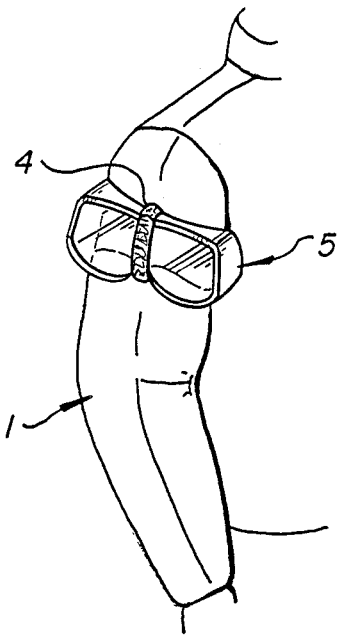

There is shown at 1 in FIG. 1 the arm portion of a skier 1 having a holder 2 secured around the upper arm portion of the skier. The ski goggle holder 2 comprises an elastic band 3 having a strap 4 affixed thereto. In FIG. 2 the arm of the skier 1 is shown with ski goggles 5 retained on the upper arm portion by means of the strap 4 which is secured around the goggles 5 and attached to the armband 3.

Figure 3:
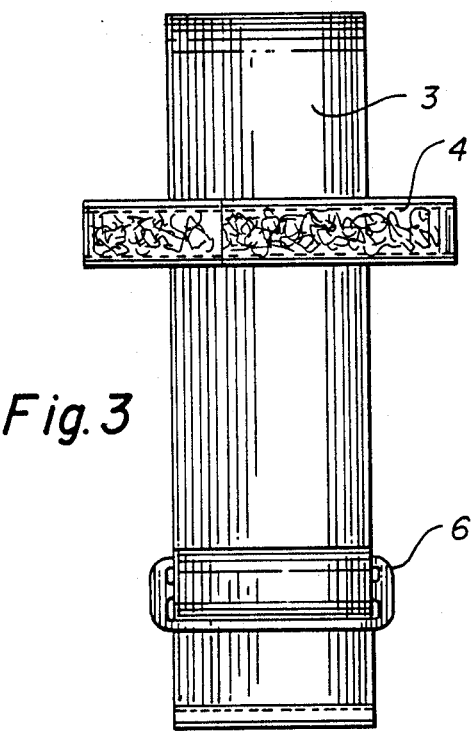
Figure 4:
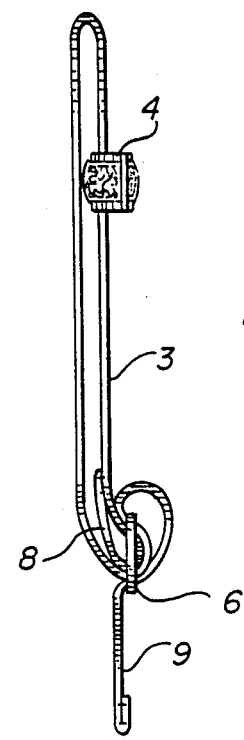

In FIG. 3 the elastic armband is shown with a buckle 6 having a central bar with a passageway on each side of the central bar. As shown in FIG. 4, one end of the elastic band 3 is secured to the central bar as shown at 8. The opposite end 9 of the armband 3 is passed through the passageways on each side of the central bar of the buckle 6 and then looped back upon itself to provide a means for adjusting the size of the armband.

Figure 5:
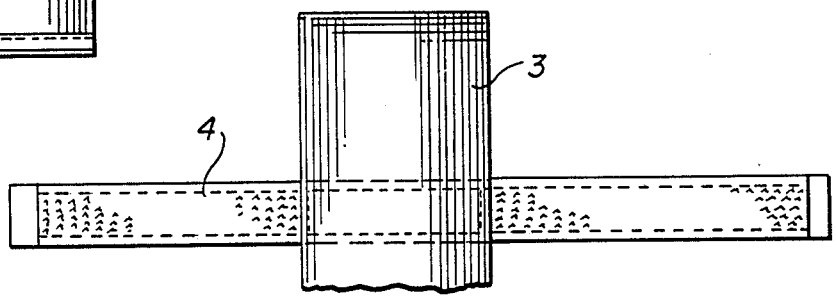

Secured to the armband 3 is a strap 4 having Velcro fastening means thereon. As shown in FIG. 5 the strap 4 extends perpendicularly with respect to the longitudinal axis of the armband 3 and the end portions of the strap 4 extend substantially beyond the side edges of the strap 3 so that the end portions of the strap may be wrapped around the ski goggles with the Velcro fastening means on the strap 4 securing the goggles between the armband 3 and the strap 4.

Figure 6:
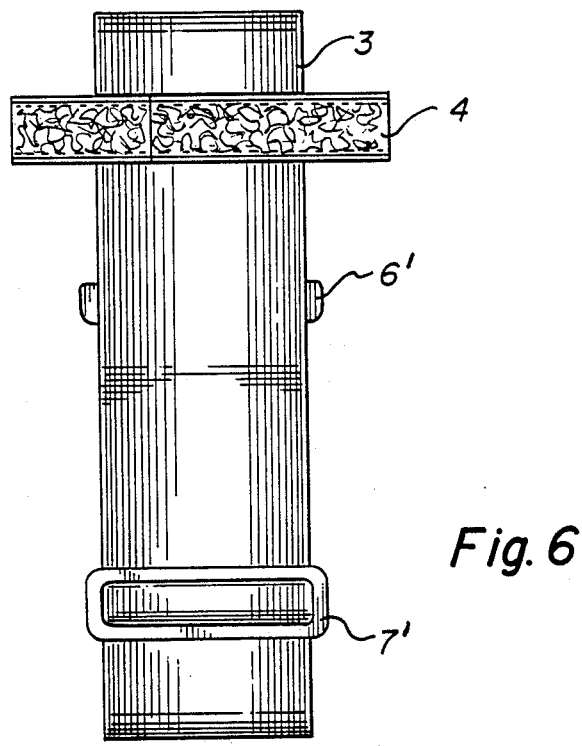
Figure 7:
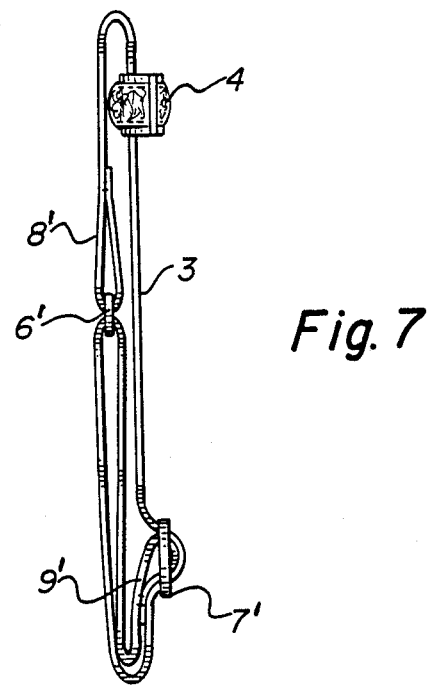

In FIGS. 6 and 7 there is shown another embodiment of the armband. In FIG. 6 the elastic armband is shown with a pair of buckles 6' and 7'. Buckle 6' has a single passageway therein and buckle 7' has a central bar to provide an opening or passageway on each side of the central bar. As shown in FIG. 7, one end 8' of the armband 3 is to one side of buckle 6'. The opposite end 9' of armband 3 passes through both passageways in buckle 7' and through the passageway in buckle 6' with the end 9' being secured to the central bar of buckle 7'. This arrangement provides for adjustment of the length of armband 3 by sliding the buckle 7' along the length of the armband.

It can be seen that the ski goggle holder according to the present invention provides an inexpensive simple structure for retaining ski goggles on the outer face of the upper arm portion of the user and permits the ready removal of the goggles from the holder with the use of one hand. This ski goggle holder also allows a skier to use it on any outfit, with any jacket, parka, sweater, shirt, other type clothing or the bare arm.

Obviously many modifications and variations of the present invention are possible in light of the above teachings.

What is claimed as new and is desired to be secured by Letters Patent is:

1. A holder for ski goggles comprising an elastic band to engage the upper portion of the arm of a user, a first buckle having a central bar and a first passageway on one side of said central bar and a second passageway on the other side of said central bar, a second buckle, one end of said elastic band being passed through the first and second passageways on said first buckle, through said second buckle and being secured to the central bar on said first buckle, the opposite end of said elastic band being secured to said second buckle whereby the length of the elastic band may be adjusted by sliding said first buckle along the length of the elastic band, an elongated strap secured to said elastic band adjacent said second buckle with the longitudinal axis of the strap extending at right angles with respect to the longitudinal axis of the elastic band and Velcro fastening means disposed on said strap whereby said elastic band may be passed around the upper portion of the arm of a user and retained in place with tension by adjusting the length of the elastic band and subsequently placing ski goggles against the elastic band over said elongated strap with said Velcro fastening means retaining the ski goggles on the upper portion of the arm of a user.

2. A holder for ski goggles according to claim 1 wherein Velcro fastening means is disposed on both sides of said strap.

* * * * *